United States Patent Office 3,299,012
Patented Jan. 17, 1967

3,299,012
PROCESS FOR THE PREPARATION OF POLYLACTONES
Roland J. Kern, Bridgeton, Mo., assignor to Monsanto Company, a corporation of Delaware
No Drawing. Filed Dec. 17, 1963, Ser. No. 331,096
12 Claims. (Cl. 260—78.5)

This invention relates to a process for the preparation of polylactones, and to ester derivatives of polylactones.

This invention particularly relates to lactones derived from alternating copolymers of certain vinyl ethers and unsaturated carboxylic acid anhydrides.

It is an object of this invention to provide a novel process for preparing polylactones.

It is another object of this invention to provide a simple direct method for converting vinyl ether/unsaturated carboxylic acid anhydride copolymers to polymers characterized by lactone rings along the polymer chains, and also containing carboxylic acid groups or ester groups along the polymer chain.

It is another object of this invention to provide a process for the preparation of ester-lactones of polymers having excellent stiffness modulus properties over a broad temperature range, and which also have excellent impact strength properties at temperatures coinciding with the temperature range where the polymers have excellent stiffness modulus properties.

The process of the invention involves the acid-catalyzed rearrangement of vinyl ether copolymers obtained by copolymerization of a vinyl ether monomer,

wherein R represents a group which forms a stable carbonium ion.

The reaction of the present invention involves the ether group attached to the polymer chain through the ether oxygen atom, when said ether group is neighboring (or adjacent) to a carbonyl group. Internal lactonization occurs with the formation of, generally, five membered rings, although four and also six membered ring lactones can also be formed.

The polymeric reactant employed in the rearrangement reaction is an alternating copolymer obtained in the catalytic copolymerization of a vinyl ether,

with an unsaturated carboxylic acid anhydride, e.g., maleic anhydride, itaconic anhydride, citraconic anhydride. The vinyl ether preferred for the preparation of these copolymers is tert-butyl vinyl ether, although I can use any vinyl ether of the formula R—O—CH=CH$_2$, wherein R represents an organic group which forms a stable carbonium ion. The carbonium ion theory is described by Whitmore in Chem. Eng. News, volume 26, page 668 (1948). Stable carbonium ions are formed by the tert-butyl group and other tert-alkyl groups of 5 to 12 carbon atoms, the benzyl group, the allyl group, and the 1-methylcyclohexyl group. Thus, suitable vinyl ether monomers, in addition to tert-butyl vinyl ether, include tert-amyl vinyl ether, 3-methyl-3-pentyl vinyl ether, and any of the tert-alkyl vinyl ethers wherein the alkyl group has up to 12 carbon atoms, benzyl vinyl ether, allyl vinyl ether and 1-methylcyclohexyl vinyl ether. The copolymeric reactant is characterized by its content of equivalent amounts of vinyl ether monomer and unsaturated acid anhydride monomer. Although I normally prefer to conduct the rearrangement with the two-component copolymer the novel reaction is applicable to polymers containing minor amounts, less than about 15 weight percent of the total polymer weight, of a third monomer. Suitable third monomers include the alkyl acrylates, alkyl methacrylates, vinyl chloride, vinylidine chloride, vinylidine fluoride, vinyl acetate, ethylene, propylene, isobutylene, α-methylstyrene, and styrene.

According to the instant invention, a rearrangement reaction, catalyzed by a Lewis acid, is used to prepare polymeric substances characterized by lactone links and also carboxylic acid groups or carboxylic acid ester groups along the polymer chain.

It will be understood that various vinyl ethers, as described above, can be used to prepare the polymeric reactant, however for convenience the invention is described with reference to the tert-butyl vinyl ether copolymer. The process can be practiced when the group attached to the vinyl group through an ether link is one known to form a stable carbonium ion.

The rearrangement of the vinyl ether/olefinic carboxylic anhydride copolymers is conducted in the presence of any of the materials known as acids within the concept of Dr. G. N. Lewis, and commonly referred to as Lewis acids. These acids are regarded as electron acceptors. Lewis acids include the inorganic acids such as HCl, H$_2$SO$_4$, H$_3$PO$_4$, HF, HNO$_3$; the organic carboxylic acids such as acetic acid, propionic acid, chloroacetic acid; and BF$_3$, trialkylboranes such as trimethylborane, triethylborane, AlCl$_3$, FeCl$_3$, SnCl$_4$, ZnCl$_2$, P$_2$O$_5$, etc.

According to my invention, a polymer containing a tert-butyl ether linkage attached to the carbon-carbon polymer backbone is rearranged under the catalytic influence of a Lewis acid. The ether linkage is usually adjacent to a carbonyl group which is incorporated into an acid anhydride linkage. The rearrangement is accomplished through the splitting of the ether linkage and the opening of the carboxylic anhydride ring with the formation of the resulting lactone.

A typical equation for the reaction can be written as follows:

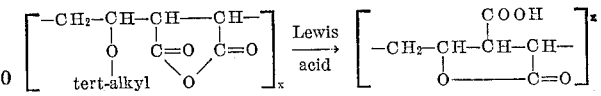

wherein $x$ is equivalent to the degree of polymerization, and generally will be 20 or more and can be as high as 1000, and up to 10,000 or even greater.

The amount of Lewis acid required to rearrange to polymers is a catalytic quantity, and it has been determined that as small a quantity as 0.01% by weight, based on the weight of the polymer, is effective. I prefer to employ from about 0.01% to about 1% by weight of the acid based on the polymer weight. If the ester-lactone is to be prepared in one step, it may be advantageous to use up to about 5% by weight of the Lewis acid, based on the polymer weight, depending upon the particular catalyst and alcohol selected. In certain instances the initial lactonization step can be conducted in the presence of 0.01% to 0.2% of a Lewis acid, and then the esterification carried out with a higher, and additional quantity of Lewis acid, e.g., 0.1% to up to 5%, by weight based on the weight of initial polymer. It is understood that considerable latitude is permitted in the preparation of the ester-lactones since the reactions can be carried out nearly simultaneously, or stepwise. If a tert-butyl vinyl ether copolymer of an olefinically unsaturated carboxylic anhydride is used as a reactant, the initial rearrangement step yields isobutylene as byproduct, and it is sometimes desirable to have a portion of the isobutylene driven from the reactor prior to increasing the temperature to conclude the esterification in order to avoid losses from the reactor due to entrainment.

Generally, the lactone-producing reaction can be carried out at room temperature, although the temperature can be increased to temperatures as high as 150° C. without adverse effect; I prefer to operate in the range of about 20° to 100° C. Temperature control can be maintained by the use of a refluxing inert organic diluent. The esterification reaction is normally conducted at a temperature sufficiently high to enable the ready removal of the water of reaction. This water can be removed as an azeotrope by the use of refluxing benzene, toluene, xylene, or ethanol or other azeotrope. Common organic solvents which boil in the range of 50° to 150° C. or higher can be employed as diluents for the esterification. It will be further understood that the reactions can be carried out at superatmospheric pressure, although generally I prefer to operate the reactor system at atmospheric pressure, or at even lower pressures.

The polymers useful in the preparation of the lactone compositions can be essentially tert-butyl vinyl ether copolymers with maleic anhydride, citraconic anhydride, or itaconic anhydride, although terpolymers containing up to about 15 weight percent of a third monomer can be used. These polymers can be prepared in the presence of a free radical type catalyst for example, an organic peroxygen compound. The peroxygen compound can be activated by trialkylboranes in promoting the polymerization, to prevent thermal rearrangement of the product during the polymerization step.

Included among the suitable peroxygen catalysts are the peroxides, such as diacetyl peroxide, acetyl benzoyl peroxide, dipropionyl peroxide, dilauroyl peroxide and methyl ethyl ketone peroxide, and the hydroperoxides such as cyclohexyl hydroperoxide, cumene hydroperoxide, tert-butyl hydroperoxide, and methyl cyclohexyl hydroperoxide. This listing is by no means a complete tabulation of suitable polymerization catalysts, but merely illustrates some of the representative materials that can be used.

The copolymerization should be conducted at low temperatures, preferably below 60° C. and more preferably below 50° C. The activation of a peroxygen compound with a trialkylborane has enabled me to conduct the polymerization at temperature below 50° C. at a reasonable reaction rate without the production of undesirable by-products.

Compounds that can be used as activators include the boron hydrides (boranes) and substituted boranes such as borane, diborane, triborane, tetraborane, trimethylborane, triethylborane, tripropylborane, trihexylborane, trioctylborane, tricyclohexylborane, triphenylborane, tribenzylborane and tritolylborane. I prefer to employ a trialkylborane of the formula $R_3B$, wherein R is an alkyl group of 1 to about 14 carbon atoms.

The boranes can be complexed with a primary, secondary or tertiary amine. Suitable amines which can be used include methylamine, dimethylamine, trimethylamine, dimethylbutylamine, triethanolamine, n-octylamine, pyridine, the picolines, aniline, dimethylaniline, the toluidines, and mixtures of different amines. The mole ratio of amine to boron compound is within the range of 0.1:2 to about 10:1, and is preferably within the range of 0.5:1 to about 2:1.

The polymerization reaction is normally conducted in an inert solvent or diluent. Those solvents which do not contain olefinic unsaturation and which are inert to the catalysts and reactants are preferred, such as benzene, toluene, xylene, tetralin, hexane, octane, dioxane, acetone, chloroform and cyclohexane.

If certain monomers are introduced into the polymerization reaction, as mentioned above, the properties of the rearranged lactone-containing polymer are correspondingly modified. Thus, if the third monomer is propylene, which does not copolymerize with tert-butyl vinyl ether, every other monomer unit along the polymer chain must be derived from the unsaturated acid anhydride. The tendency of two anhydride units to enter the chain adjacent to one another is very low. In this situation, the propylene then competes only with the tert-butyl vinyl ether to appear in the chain as alternating comonomer unit with the unsaturated acid anhydride. The tert-butyl vinyl ether then participates to a lesser extent in the polymerization, resulting in the reduction of the number of lactone rings that can be produced along the polymer chain during the Lewis acid-catalyzed rearrangement step.

The polymer obtained as the result of the rearrangement reaction contains the reactive lactone ring and additionally has activated caboxylic acid groups attached to the polymer backbone. The acid groups can be esterified, e.g. with alcohols of up to about 20 carbon atoms, to produce other polymers having desirable physical properties including high modulus over a broad temperature range and high impact strength.

I have found that the rearrangement reaction can be conducted in the presence of an alcohol so that ester lactones can be produced in a single convenient reaction. The Lewis acid catalyst which is used to prepare the lactone can also be the esterification catalyst.

It is of course known that copolymers of unsaturated carboxylic anhydrides and alkyl vinyl ethers can be prepared wherein the alkyl group is attached to the ether oxygen through a primary or secondary carbon atom. When these polymers are subjected to an attempted lactonization, or lactonization-esterification reaction, the anhydride linkage is merely opened and partial esters are prepared. It is necessary, for successfully conducting the rearrangement reaction, that a tert-alkyl group or other group that forms a stable carbonium ion, as described above, be attached to the ether oxygen atom.

In order to illustrate some of the various aspects and advantages of the invention, representative examples are given below. It will be understood that variations from the particular reactants, catalysts, proportions and processing techniques can be made without departing from the invention.

*Example 1*

A 500 ml. glass reactor, fitted with mechanical stirrer and reflux condenser, was charged with 80 ml. dry benzene, maleic anhydride (19.6 g., 0.2 mole) and tert-butyl vinyl ether (20.0 g., 0.2 mole). Lauroyl peroxide (0.15 g.) was added and the solution warmed to about 40° C. Polymerization occurred at a rapid rate and the white copolymer precipitated from solution in quantitative yield. The product was purified by dissolving it in chloroform and precipitating it with benzene.

*Example 2*

The copolymerization of tert-butyl vinyl ether and maleic anhydride was repeated as described in Example 1, with the exception that dry chloroform was used as the polymerization solvent. The reaction took place rapidly and was completed within an hour at 35–45° C. Part of the viscous solution was used to cast a film on a glass plate, and the remainder was treated with benzene to precipitate the white copolymer. Infrared spectroscopic examination of the copolymer was used to confirm the formation of the alternating copolymer. The product, whether produced according to the procedure of Example 1 or Example 2, had a specific viscosity of 0.155, measured as a 0.1% solution in acetone at 25° C.

*Example 3*

A dry 300 ml. glass reactor, fitted with stirring device and reflux condenser, was charged with 100 ml. dry benzene, redistilled citraconic anhydride (22.8 g., 0.2 mole) and tert-butyl vinyl ether (20.0 g., 0.2 mole). The polymerization catalyst, consisting of 0.05 g. lauroyl peroxide and 0.3 ml. triethylborane, was added and the solution stirred at 30–40° C. The polymerization proceeded rapidly, as evidenced by a gradual but apparent increase in the solution viscosity. The reaction was judged to be completed after six hours at 30–40° C. The copolymer was purified by precipitating it with methanol, redissolving it in chloroform and again precipitating with hexane. The snow white product was dried in the vacuum oven to remove traces of adhering solvent. It was possible to cast a clear, colorless film onto a glass plate by using a chloroform solution of this product. The copolymer had a specific viscosity of 0.09, measured as a 0.1% solution in acetone at 25° C., and gave excellent elemental analytical results, in comparison with the calculated values for carbon and hydrogen. This copolymer was further characterized as the alternating copolymer by infrared absorption spectra. It was easily soluble in benzene whereas the corresponding maleic anhydride copolymer is insoluble in benzene.

It was determined that this copolymerization proceeded to completion under the same conditions as described above, but without the employment of a diluent. The copolymer had similar properties to that obtained when a diluent was used.

Example 4

A sample of the tert-butyl vinyl ether/maleic anhydride copolymer of Example 1, 10.0 g. was placed in a glass reactor fitted with motor-driven stirrer and reflux condenser vented to a gas sampling device. A quantity of dry benzene, 200 ml., was added and the dispersion stirred at room temperature while 0.1 g. boron trifluoride etherate was added. The reactants were stirred at reflux for 3 hrs.

The product polymer was filtered from the cooled benzene. It was dissolved in acetone and precipitated by the addition of benzene to the solution to obtain 9.6 g. of white product. Since BF$_3$ has a pronounced proclivity to form complexes, the product was dissolved in aqueous sodium carbonate solution and precipitated by neutralizing the solution with aqueous hydrochloric acid. The polymer was then thoroughly washed with distilled water to remove any adhering salt and dried in the vacuum oven. The infrared spectrum of this polymer was compared with the infrared spectrum of the original tert-butyl vinyl ether/maleic anhydride copolymer. The lactone spectrum was consistent with the postulated loss of the tert-butyl group and/or the tert-butoxy group (at 7.2, 8.0 and 12.3 microns) and also the loss of characteristic anhydride band (at 5.40 microns), while a new band characteristic of hydrogen bonded carboxylic acid was present (at 6.1 microns).

It will be understood that lactone formation is not limited to products of five-membered rings, but that four-membered and six-membered lactones can also be obtained, according to the equation:

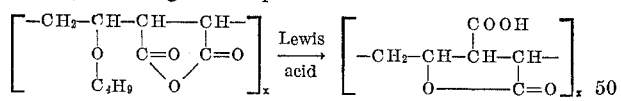

or

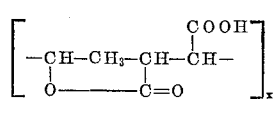

or $$\left[\begin{array}{c}-CH_2-CH-CH-CH-\\ \phantom{-CH_2-}O\phantom{-CH-}C=O\\ \phantom{-CH_2-CH-CH}COOH\end{array}\right]_x$$

Example 5

A sample of the tert-butyl vinyl ether/maleic anhydride copolymer of Example 2, 10.1 g., was charged to a reactor as used in Example 4, but with a Dean and Stark moisture trap fitted to the reflux condenser An addition of 100 ml. 2-ethylhexanol was made followed by 0.5 g. concentrated sulfuric acid, and 50 ml. toluene. The reactants were stirred at the temperature of refluxing toluene and water produced by the esterification reaction was collected in the moisture trap.

The gas given off during the early stage of the rearrangement was determined to be isobutylene by analysis in the gas chromatograph. Water began to collect in the trap soon after refluxing temperature was reached and the reaction appeared to be complete after 3 hours at reflux; however, stirring at reflux was continued for a total time of eight hours. The reactants were cooled and poured into excess methanol to precipitate all the product polymer. After the product was collected on a filter, it was dissolved in acetone and reprecipitated with fresh methanol. This step was repeated a second time with fresh solvents, and the product finally dried in the vacuum oven to remove traces of adhering solvent. Elemental analysis and infrared spectroscopy were used to confirm that the ester-lactone was obtained. A trace quantity of sulfur was found in the product indicating that minute quantities of a complex or sulfuric ester are obtained. This finding is consistent with the result obtained when the alcoholysis of polyvinyl acetate is conducted with sulfuric acid catalyst. In the latter reaction some sulfuric acid esters of polyvinyl alcohol are obtained.

A sample of the 2-ethylhexyl lactone ester had an Izod notched impact strength of 55 ft. lb./in. notch when evaluated as a compression molding, and 3 ft. lb./in. notch when tested as an injection molding. The product was further characterized by a stiffness modulus, at 25° C., of 90,000 p.s.i.

This example shows that a convenient one-step process can be used to prepare ester lactone polymers having excellent physical properties.

Example 6

A sample of the tert-butyl vinyl ether/citraconic anhydride copolymer from Example 3, 5.0 g., was dissolved in 100 ml. benzene, 0.1 g. BF$_3$-etherate added and the solution stirred at reflux for 3 hours. The cooled mixture was diluted with 300 ml. methanol and the product polymer filtered off. The carboxy lactone was readily soluble in aqueous dilute sodium carbonate solution from which it was precipitated with dilute hydrochloric acid. The lactone structure was confirmed by infrared spectroscopy.

Example 7

A 10 g. sample of the tert-butyl vinyl ether/citraconic anhydride copolymer prepared according to the procedure of Example 3 was charged to a reactor along with 100 ml. of a branched nonyl alcohol produced by the oxo process, 40 ml. toluene and 0.5 g. toluenesulfonic acid. The reactants were stirred at reflux for 4 hours to rearrange and esterify the copolymer to produce the lactone ester, which was isolated and purified as described in Example 5. This product had physical properties comparable to those of high density polyethylene.

Example 8

Vinyl ether copolymers were prepared according to the procedures of Examples 1–3, including methyl vinyl ether/maleic anhydride
ethyl vinyl ether/citraconic anhydride
isobutyl vinyl ether/maleic anhydride.

Attempts were made to prepare lactone esters from these polymers by heating with a Lewis acid in excess alcohol. In each instance concentrated sulfuric acid was used as the catalyst and 2-ethylhexanol as the alcohol. The products were found to be the esters formed from the carboxylic acids as the anhydride ring was opened. In none of the cases did infrared show the presence of the lactone ring.

On the other hand, the lactone esters are obtained in the instance where the initial copolymer is formed from ROCH=CH$_2$ and maleic anhydride,citraconicanhydride or itaconic anhydride, wherein R represents a group that forms a stable carbonium ion as described above. These lactone esters, especially those prepared from long chain alcohols (C$_8$–C$_{18}$) possess remarkable physical properties, for example, they have excellent stiffness modulus properties over a broad temperature range, and additionally they have high impact strength at temperatures where high stiffness modulus properties prevail. The physical properties of these polymeric lactone esters compare favorably with the properties of polyethylene and nylon, and are significant in the coincidence of high modulus with excellent impact strength.

While the invention has been described with particular reference to preferred embodiments thereof, it will be appreciated that variations from the details given herein can be effected without departing from the invention in its broadest aspects.

What is claimed is:

1. A process for rearranging interpolymers of olefinically unsaturated carboxylic anhydrides and vinyl ethers of the formula $R-O-CH=CH_2$, wherein R represents a radical capable of forming a stable carbonium ion, which comprises contacting said interpolymers with a catalytic quantity of a Lewis acid and obtaining polymers characterized by lactone groups along the polymer chains.

2. A process for preparing polymers characterized by lactone groups along the polymer chains which comprises subjecting a vinylether/olefinically unsaturated carboxylic anhydride copolymer to a rearrangement under the catalytic influences of a Lewis acid, wherein said copolymer is derived from a vinyl ether monomer of the formula $R-O-CH=CH_2$, wherein R represents a radical that forms a stable carbonium ion.

3. A process for preparing ester lactones of polymers which comprises contacting an alternating interpolymer with a Lewis acid in the presence of an alcohol at a temperature sufficient to effect rearrangement and esterification, wherein said alternating interpolymer is obtained by the polymerization of unsaturated monomers comprising a carboxylic anhydride and a vinyl ether of the formula $R-O-CH=CH_2$, wherein R represents a group capable of forming a stable carbonium ion.

4. A process for preparing polymers characterized by lactone groups along the polymer chain which comprises heating a tert-alkyl vinyl ether/unsaturated carboxylic anhydride polymer with a catalytic quantity of a Lewis acid.

5. The process of claim 4 wherein said unsaturated carboxylic anhydride is maleic anhydride.

6. The process of claim 4 wherein said unsaturated carboxylic anhydride is citraconic anhydride.

7. The process of claim 4 wherein said unsaturated carboxylic anhydride is itaconic anhydride.

8. A process for preparing ester lactones of polymers which comprises heating to reaction temperatures a tert-alkyl vinyl ether/unsaturated carboxylic anhydride polymer with a catalytic quantity of a Lewis acid and an alcohol.

9. The process of claim 8 wherein the tert-alkyl vinyl ether is tert-butyl vinyl ether and the carboxylic anhydride is maleic anhydride.

10. The process of claim 8 wherein the tert-alkyl vinyl ether is tert-butyl vinyl ether and the carboxylic anhydride is citraconic anhydride.

11. The process of claim 8 wherein the tert-alkyl vinyl ether is tert-butyl vinyl ether and the carboxylic anhydride is itaconic anhydride.

12. A process for the preparation of ester lactones of polymers which comprises heating to reaction temperature an alternating copolymer of a tert-alkyl vinyl ether and an anhydride selected from the group consisting of maleic anhydride, citraconic anhydride and itaconic anhydride with a catalytic quantity of a Lewis acid and an alcohol.

No references cited.

JOSEPH L. SCHOFER, *Primary Examiner.*

L. G. CHILDERS, *Assistant Examiner.*